United States Patent [19]

Okino

[11] Patent Number: 4,951,065
[45] Date of Patent: Aug. 21, 1990

[54] PERIOD VARYING BEAM RECORDER

[75] Inventor: Yoshiharu Okino, Minami-ashigara, Japan

[73] Assignee: Fuji Photo Film Co., Ltd., Kanagawa, Japan

[21] Appl. No.: 325,714

[22] Filed: Mar. 20, 1989

[30] Foreign Application Priority Data

Mar. 18, 1988 [JP] Japan .................................. 63-66926

[51] Int. Cl.$^5$ ............................................ G01D 15/14
[52] U.S. Cl. ..................................... 346/108; 358/296
[58] Field of Search ................. 346/108, 107 R, 76 L, 346/160; 358/296, 300, 302

[56] References Cited

U.S. PATENT DOCUMENTS

| | | | |
|---|---|---|---|
| 4,586,057 | 4/1986 | Schoon | 346/108 |
| 4,587,531 | 5/1986 | Dangler | 346/108 |
| 4,620,200 | 10/1986 | Fukai | 346/108 |
| 4,698,692 | 10/1987 | Fry et al. | 346/108 |

Primary Examiner—Mark J. Reinhart
Attorney, Agent, or Firm—Sughrue, Mion, Zinn, Macpeak & Seas

[57] ABSTRACT

In a period varying beam recorder comprising a light source for emitting a light beam carrying picture information and an optical deflector for deflecting the light beam in a plane, wherein the light beam is directed to a photosensitive material or member to conduct primary scanning, and the light beam is deflected in the plane at least over an effective scanning width necessary for the primary scanning of the photosensitive material or member, photodetectors are disposed outside opposite ends of the effective scanning width for detecting the light beam for determining a scanning time over the effective scanning width, and an image processing circuit is provided for controlledly producing a picture element sync signal and for carrying picture information on the light beam in accordance with the sync signal, whereby the picture element sync signal has a variable period and the period of the picture element sync signal is controlled on the basis of the scanning time such that the exposure timing of each picture element is optimized.

4 Claims, 3 Drawing Sheets

F I G. 3A
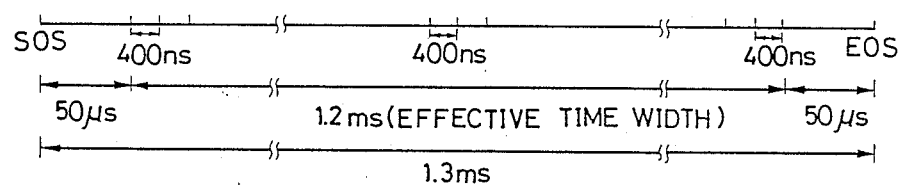
F I G. 3B
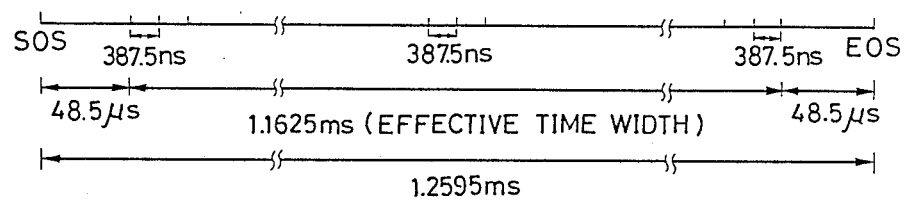
F I G. 3C
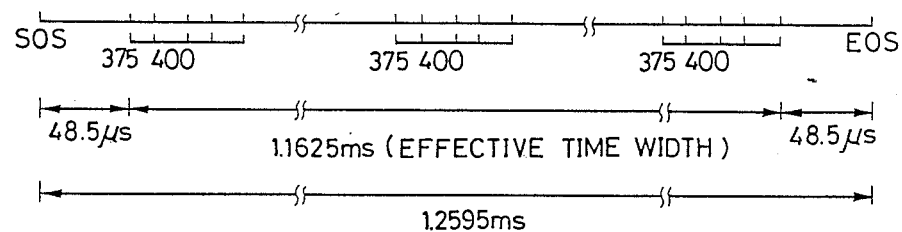

PERIOD VARYING BEAM RECORDER

This invention relates to a period varying beam recorder, and more particularly, to a period varying beam recorder which uses a rotary polygonal mirror to deflect a light beam in a plane to conduct primary scanning wherein a correction circuit is provided for correcting a jitter of a picture element position due to a rotation variation of a long period inherent to the rotary polygonal mirror.

BACKGROUND OF THE INVENTION

Conventional image recording apparatus used in general printing, photographic printing, and copying use a light-emitting element such as laser diodes (LD) or light-emitting diodes (LED) as a light source for emitting a light beam for exposure of a recording carrier such as a photosensitive material or member. An optical modulator is used to carry picture information on the light beam. An optical deflector typically in the form of a rotary polygonal mirror deflects the light beam in a plane or in a linear direction to conduct digital primary scanning of the recording carrier. Auxiliary scanning is conducted to rotate or transfer the recording carrier as the primary scanning is continued, forming an image on the recording carrier. Thus, highly stable image signals of high quality are obtained by combining a laser with an optical modulator for modulating electrical signals indicative of picture information into optical signals and a scanner using a polygonal mirror.

The polygonal mirror ensures constant rotation at high rotation speed ranges, but experiences a speed variation at low rotation speed ranges. As the rotation speed lowers, the speed variation increases, inducing a jitter of a picture element position as will be later described in conjunction with FIG. 4.

To produce a stable image with laser scanning using a polygonal mirror, a high precision motor or a motor having an increased inertia must be used. The high precision motor is expensive, with the increased cost of a polygonal mirror assembly. The motor having an increased inertia has a certain limit above which the precision of rotation in low speed ranges cannot be improved, failing to achieve sufficient stabilization in low speed ranges.

For an assumed scanning time of 1.2 msec. as used in image recording at a density of 400 lines/inch for 10 seconds, for example, when it is desired to reduce the jitter caused by a variation in rotation of a polygonal mirror to within ±0.0025%, it is necessary to correct the scanning time within 30 nsec. (=1.2 msec.×0.000025=3×10$^{-5}$ msec.). Assume that there are 3,000 picture elements per line, in order to obtain a precision of 30 nsec./line by controlling a clock pulse per picture element of 400 nsec. (1.2 msec./3000 picture elements), the clock pulse per picture element of 400 nsec. must be corrected in a unit of 0.01 nsec. (30 nsec./3000 picture elements). The base clock used for control in 0.01 nsec. unit must have a frequency of 100 GHz (=1/0.01×10$^{-9}$=100×10$^9$). This frequency is impractical because it is not available with commercial circuit elements currently used in business machines.

SUMMARY OF THE INVENTION

An object of the present invention is to provide an improved period varying beam recorder in which a rotary polygonal mirror is used to deflect a picture information-carrying light beam in a plane or in a linear direction to conduct primary scanning on a photosensitive material or member for image recording, the fluctuation or jitter of a picture element position caused by a variation in rotation of the rotary polygonal mirror is minimized by using a jitter correcting circuit which, in cooperation with a lower frequency clock generating a basic signal, controls the period of a picture element sync signal in accordance with the rotation variation, thus always producing a distortion-free image.

According to the present invention, there is provided a period varying beam recorder comprising:

a light source for emitting a light beam carrying picture information;

an optical deflector for deflecting the light beam in a plane, the light beam being directed to a photosensitive material or member to conduct primary scanning, the light beam being deflected in the plane at least over an effective scanning width necessary for the primary scanning of the photosensitive material or member;

detector means disposed outside of at least one end of the effective scanning width for detecting the light beam for determining a scanning time over the effective scanning width;

period varying means for varying the period of a picture element sync signal for use in carrying picture information on the light beam; and control means for controlling the period of the picture element sync signal on the basis of the scanning time such that the exposure timing of each picture element is optimized.

BRIEF DESCRIPTION OF THE ACCOMPANYING DRAWINGS

The above and other objects, features, and advantages of the present invention will be better understood from the following description taken in conjunction with the accompanying drawings, in which:

FIG. 3A is a time chart showing standard picture element periods for a standard effective time width employable in the image recording apparatus of the present invention;

FIG. 3B is a time chart showing desired picture element periods for an actually measured effective time width;

FIG. 3C is a time chart showing optimized picture element periods for the same effective time width as FIG. 3B.

DETAILED DESCRIPTION OF THE PREFERRED EMBODIMENT

The photosensitive material used herein is preferably a photosensitive material capable of forming an imagewise latent or developed image through chemical reaction, including silver halide-based photosensitive materials, photosensitive resinous materials, and photosensitive pressure-sensitive materials.

The last mentioned photosensitive pressure-sensitive material is a material capable of forming through imagewise exposure an image which is transferred to an image-receiving layer of an image-receiving material with the aid of pressure to produce a visible image. Such materials include one of the type wherein a polymerizable compound is cured imagewise through imagewise exposure followed by pressure transfer to produce a visible image as disclosed in Japanese Patent Application Kokai (JP-A) No. 57-179836. This material is disclosed as comprising on a support capsules of synthetic polymeric resin wall containing a vinyl compound, a photopolymerization initiator, and a coloring agent precursor.

The photosensitive materials used herein also may be of the type wherein a preliminary heat or wet development is followed by pressure transfer. One example of such material is disclosed in Japanese Patent Application Kokai (JP-A) No. 61-278849, which is of the type containing a silver halide and a polymerizable compound wherein imagewise exposure is followed by heat development of the silver halide, the polymerizable compound is cured accordingly, and pressure is then applied to produce a visible image. In this photosensitive material, at least a photosensitive silver halide, a reducing agent, a polymerizable compound, and a color image forming substance are applied on a support, at least the polymerizable compound and color image forming substance being enclosed in the same microcapsules.

The photosensitive member used herein may be a photosensitive member for electrophotographic image formation, including organic photoelectric conductors (OPC), zinc oxide photosensitive members, and those members comprising a photoelectric conductors such as selenium, selenium alloys, cadmium sulfide, amorphous silicon and composite multi-layer photosensitive members.

Hereinafter one preferred embodiment of the period varying beam recorder according to the present invention is described in conjunction with the accompanying drawings.

Figure 1:
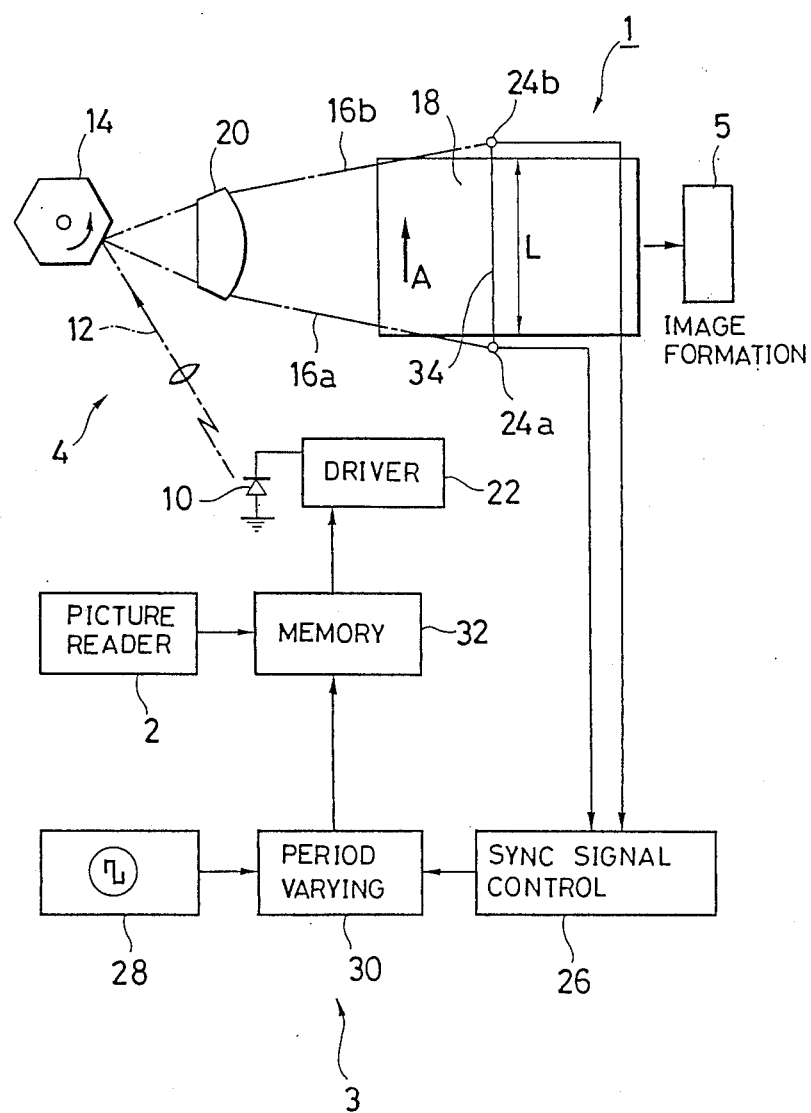
FIG. 1 is a block diagrammatic illustration of a period varying beam recorder according to one embodiment of the present invention.

FIG. 1 is a block diagram illustrating one preferred embodiment of the period varying beam recorder according to the present invention. The period varying beam recorder generally designated at 1 is illustrated as generally comprising an image reading section 2 for reading the picture information of an original and producing an electrical signal indicative of the picture information, an image processing section 3 for determining an exposure and an exposure timing, that is, a period of a picture element sync signal from a clock on the basis of the picture information-indicative electrical signal, an image exposure section 4 for conducting imagewise exposure in accordance with the exposure and the period of a picture element sync signal determined by the image processing section 3, and an image forming section 5 for reproducing a visible image, including a photosensitive material or member capable of forming a latent or developed image through imagewise exposure. The image exposure section 4 includes a light source 10 for emitting a light beam 12, an optical deflector 14 for linearly deflecting the light beam 12 into light beams 16a to 16b, an fθ lens 20 for focusing the deflected light beams 16a to 16b on a subject to be scanned or recording carrier 18 in the form of a photosensitive material or member, and a drive source 22 for driving the light source 10.

The light source 10 used herein may be any desired one including light-emitting elements such as laser diodes (LD) and light-emitting diodes (LED), gas lasers such as argon laser and $CO_2$ laser, and various other lasers.

The optical deflector 14 used herein serves to deflect the light beam 12 into a series of light beams in a plane over a certain range. For brevity of description, the light beams at opposite extreme ends are designated in FIG. 1 as light beams 16a and 16b. More particularly, the deflector 14 deflects the picture information-carrying light beam 12 from the light source 10 in a linear direction substantially perpendicular to the direction of auxiliary scanning on the subject to be scanned 18 in the form of a photosensitive material or member. The deflector 14 may be a commonly used rotary polygonal mirror. A mirror which rotates with speed variations in periods of low speed operation may be employed although a smaller speed variation is preferred. The deflector is designed such that the deflection width of deflected light beams 16a to 16b is larger than the effective scanning width, or length L, corresponding to the width of the subject 18.

The image processing section 3 which is characteristic of the present invention includes beam detectors 24a and 24b for detecting the deflected light beams 16a and 16b to determine the deflection width thereof, picture element sync signal control means 26 for measuring the time difference between the beam detectors 24a and 24b detecting the light beams 16a and 16b, computing a picture element period, and controlling a picture element sync signal on the basis of the computed result, a base clock 28 for producing a clock pulse at a fundamental frequency on which the sync signal is based, period varying means 30 for varying the picture element period in cooperation with the picture element sync signal control means 26, and a memory 32 for storing the picture element sync signal determined by the period varying means 30 and the picture information of each picture element read by the image reading section 2.

The beam detectors 24a and 24b may be located so as to receive the deflected light beams 16a and 16b at opposite extreme ends, and thus outside the effective scanning width L of the primary scanning line that a series of deflected light beams 16a to 16b delineate on the subject 18. The beam detectors 24a and 24b may be any desired one as long as they can detect a light beam. Such beam detectors include photo detectors comprising a light-receiving element including a photo diode (PD) or photo transistor as well as photo detectors comprising an electronic circuit having such a light-receiving element built therein.

As shown in FIG. 1, with rotation of the optical deflector 14 in the direction of an arrow, the light beam 16 is moved from 16a to 16b in the direction of arrow A. Thus, the light beam 16a at one end is at the start-of-scanning (SOS) position, and the corresponding beam detector 24a detects the point of start of scanning a line. In this sense, the detector 24a may be called an SOS sensor. The light beam 16b at the opposite end is at the end-of-scanning (EOS) position, and the corresponding beam detector 24b detects the point of end of scanning the line. In this sense, the detector 24b may be called an EOS sensor.

Although the beam detectors 24a and 24b are disposed in register with the deflected light beams 16a and 16b at opposite extreme ends in the embodiment shown in FIG. 1, the detectors may be disposed anywhere on an extension of the primary scanning line 34 and outside the effective scanning width L insofar as they can receive the deflected light beams 16a to 16b. Although the beam detectors are provided to detect both the start-of-scanning (SOS) and end-of-scanning (EOS) positions in the embodiment shown in FIG. 1, it is only necessary to detect either one of these positions. Provision of either the SOS sensor 24a or the EOS sensor 24b thus is encompassed in the present invention.

The base clock 28 is not particularly limited. Any commonly used clocks of an ordinary frequency are employable. For example, useful clocks deliver clock pulses at a frequency of the order of from several MHz to several hundred MHz.

The period varying means 30 may be any desired one insofar as it can vary the period of a sync signal of each picture element. Preferred is a frequency demultiplier or divider which demultiplies the clock pulse of the base clock 28.

The picture element sync signal control means 26 functions to measure the time difference between the points of start-of-scanning (SOS) and end-of-scanning (EOS) on the basis of detection signals of the beam detectors 24a and 24b which detect the light beams 16a and 16b, compute the period of a picture element sync signal (to be simply referred to as a picture element period), and determine the periods corresponding to the number of picture elements necessary for one line as a combination of periods obtained by demultiplying the fundamental frequency of the base clock 28, thereby to minimize a deviation of each picture element from its ideal position.

The picture element sync signal control means 26 includes means for determining the number and position of changing the picture element period so as to minimize a deviation of each picture element from its ideal position. With this construction, the maximum picture element position deviation is controlled to a half period of the fundamental frequency of the base clock 28.

Figure 2:
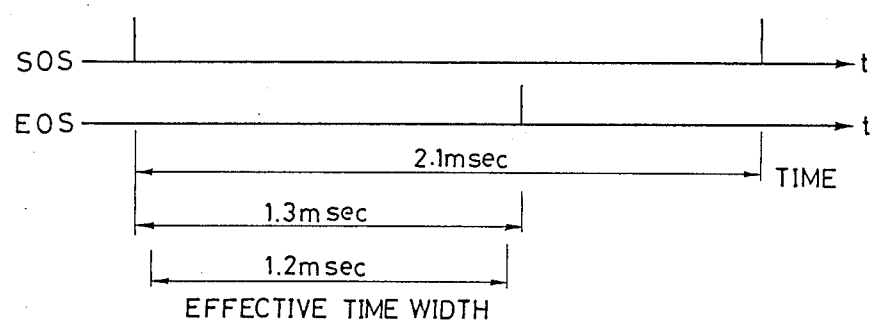
FIG. 2 is a time chart showing signals of SOS and EOS sensors used as the detector means in the period varying beam recorder of the present invention.

In connection with the embodiment wherein the image processing section 3 of the present invention includes the SOS and EOS sensors 24a and 24b as shown in FIG. 1, the method of controlling exposure timing using the picture element sync signal control means 26 according to the present invention is described now by referring to a typical example in which signals are obtained at time intervals as shown in FIG. 2 in the ideal state where the optical deflector 14 is free of speed variations. This specific example assumes that the SOS sensor produces signals at a period of 2.1 msec., the time interval between signals of SOS and EOS sensors is 1.3 msec., and the scanning time interval over the effective scanning width L or effective scanning time width is 1.2 msec.

Assume that one line contains 3,000 picture elements, then the picture element period per picture element is 400 nsec.

Figure 4:
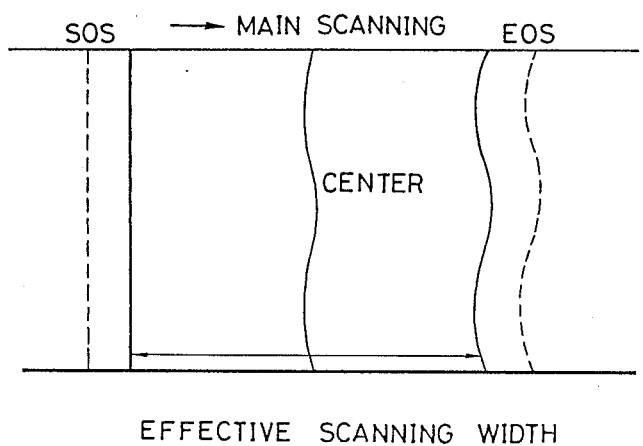
FIG. 4 is a diagram showing how jitter occurs in a prior art image recording apparatus.

If the optical deflector 14 rotates with speed variations, the scanning speed in the primary scanning direction shown by arrow A varies at (v0±Δv). When a picture element signal is synchronized to the clock pulse of the fixed period, a jitter or fluctuation occurs at each picture element position as shown in FIG. 4. This picture element position jitter is given by (v0±Δv)·(n·t0+0.5 msec.) where n is a picture element number of from 1 to 3,000 and t0 is a picture element period of 400 nsec.

The jitter results from a rotation speed flutter of the optical deflector 14 at periods of several tens of lines to several hundred lines. When a picture element signal is synchronized to the clock pulse of the fixed period using the timing of an SOS signal as a reference, the picture element position deviation due to jitter becomes larger as the position is moved away from the SOS.

Assume that the fundamental pulse of the base clock 28 has a frequency of 40 MHz. There can be generated clock pulses having a period of 400 nsec. with a demultiplication ratio of 1/16, clock pulses having a period of 375 nsec. with a demultiplication ratio of 1/15, and clock pulses having a period of 425 nsec. with a demultiplication ratio of 1/17. A particular demultiplication ratio is selected for each picture element, depending on the total clock shift quantity (deviation quantity) of the currently scanning line on the basis of the time difference between SOS and EOS signal of the last scanning line. Once the particular demultiplication ratio is selected, the number and position of clock pulses to be used are determined. Among sets of combined clock pulses of different periods, a set of combined clock pulses minimizing the picture element position deviation is selected. Picture element signals are synchronized to the combined picture element sync signals, conducting primary scanning.

It is described hereinafter how to determine a set of picture element sync signals. Provided that a scanning line contains 3,000 picture elements, for example, in the ideal state where the optical deflector 14 is free of speed variations, primary scanning is carried out along the line using clock pulses with an SOS-to-EOS signal interval of 1.3 msec., an effective scanning time width of 1.2 msec., and a picture element period of 400 nsec. as shown in FIG. 3A. If a deviation occurs due to speed variations of the optical deflector 14, so that the SOS-to-EOS signal interval is reduced to 1.2595 msec. as shown in FIG. 3B, then the effective scanning time width is 1.1625 msec. and primary scanning must be carried out along the line using clock pulses with a picture element period of 387.5 nsec. in order to avoid jitter.

Nevertheless, the base clock 28 has a fundamental frequency of 40 MHz as previously described, from which a picture element period of 387.5 nsec. cannot be derived by demultiplication. A compromise is to use the two closest clock pulses between which the picture element period of 387.5 nsec. is located. Since the fundamental frequency of the base clock 28 is 40 MHz, a choice is made of two clock pulses having a frequency of 375 and 400 nsec. with a difference of 25 nsec. therebetween.

Instead of scanning 3,000 picture elements at a picture element period of 387.5 nsec., 1,500 picture elements are scanned at a picture element period of 375 nsec. and the remaining 1,500 picture elements are scanned at a picture element period of 400 nsec. During scanning, the time intervals between SOS and start of effective scanning and between end of effective scanning and EOS are each 48.5 μsec.

As to the combination, picture element periods of 375 and 400 nsec. are alternately combined as shown in FIG. 3C. Then the deviation from the correct picture element position is reduced to ±12.5 nsec. and thus, the deviation per picture element is reduced to within ±1/31 of picture element. In this way, the maximum deviation can be reduced to 25 nsec. and about 1/15 of the picture element by the deviation correcting procedure involving using variable picture element periods and optimizing the number and position of variable picture element periods. This deviation correcting procedure can correct jitters having an SOS-to-EOS signal time interval in the range of from 1.218 msec. to 1.381 msec. Low frequency jitters can be reduced to at most ±0.0021%.

In the above-mentioned embodiment, scanning is carried out by computing an effective scanning time interval from the SOS-to-EOS signal time difference, computing the desired picture element period from the effective scanning time interval, selecting two clock pulses close to the desired picture element period, and combining the two clock pulses such that the deviation from the desired picture element period is minimized. Any combinations of clock pulses may be employed as long as the deviation falls within the permissible range. Further, in these combinations of two different clock pulses used as the picture element period, one clock pulse may be changed to the other clock pulse at any desired position or in any desired sequence.

In the above-mentioned embodiment, the SOS and EOS sensors 24a and 24b are used as the light beam detectors, the time interval between detections of the two sensors including the effective scanning time width is measured, and the effective scanning time width is computed therefrom. The present invention is not limited to this embodiment because the effective scanning time width may be computed from the time interval between two successive SOS or EOS points which can be measured with only one detector, that is, either SOS sensor 24a or EOS sensor 24b. In this case, better results are obtained by computing the scanning time difference as a total quantity based on the division precision (or angle precision between two adjacent surfaces) of the rotating polygonal mirror before the above processing is started. It is also possible to compute deviations from the standard picture element period and the standard effective scanning time width, compute picture element periods to be changed from the standard picture element period as well as the total number and position of the picture element periods, and determine a combination of picture element periods capable of providing a minimized jitter. The image reader used in the image reading section 2 according to the present invention may be selected from any conventional well-known image readers, typically those disclosed in Japanese Patent Application Nos. 61-315536 and 62-187831, both assigned to the same assignee as the present invention.

In the above-mentioned embodiment, the picture information read by the image reading section 2 is decomposed into picture elements on each line in the image processing section 3 and synchronized to a picture element sync signal having an optimum variable period whereby primary scanning is conducted on the subject 18 in the form of a photosensitive material. The present invention is not limited to this embodiment. The image reading section 2 may be omitted if picture information can be stored in the memory 32.

The image forming section 5 is an image forming or recording device capable of providing a reproduced image as a visible image, which may include a developing section for developing a recording carrier which has been exposed by way of the image exposure section 4, and thus has carried thereon the picture information corresponding to the original picture and a fixing section for fixing the information on the carrier, or a transfer section for transferring the information to another recording medium and a fixing section for fixing the information on the medium, or a post-heating section for heat color development.

Alternatively, the image forming section 5 of the apparatus according to the present invention may be either an electrophotographic device or an image recording or forming device utilizing a chemical reaction process.

Examples of the image forming or recording device which may be used to constitute the image forming section 5 include a copying apparatus as disclosed in Japanese Patent Application No. 61-315536 and an image forming apparatus as disclosed in Japanese Patent Application No. 62-187831, both assigned to the same assignee as the present invention.

The following describes the operation of the period varying beam recorder of the present invention which is of the above-described constitution.

First, with an original placed on an original support, the start button is pressed to actuate the image reading section 2 which reads the original picture to produce an electrical signal.

The electrical signal indicative of picture information is transmitted from the image reading section 2 to the image processing section 3. In the image exposure section 4, the light source 10 is turned on, and the optical deflector 14 starts primary scanning on the subject 18 in the direction of arrow A. The SOS and EOS sensors 24a and 24b constituting the light beam detector means detect the light beams 16a and 16b at opposite ends to determining the time interval between SOS and EOS. The picture element sync signal control means 26 computes the effective scanning time width from the time interval, and further computes a desired deviation-free or correct picture element period therefrom. The means 26 compares the desired period with the standard period of a picture element sync signal (standard picture element period) which is obtained by demultiplying the fundamental clock pulses of the base clock 28, for example, having a frequency of 40 MHz, or compares the computed effective scanning time width with the standard effective scanning time width derived from the standard picture element period. Then, the means 26 computes the quantity by which the standard picture element period is varied and the number and position (or sequence) of such varied different periods, and eventually determines a combination of different picture element periods providing a minimum deviation from the desired picture element period.

In accordance with this combination of different picture element periods, the fundamental clock pulses of the base clock 28 are demultiplied by the period varying means 30 typically in the form of a demultiplier. The period varying means 30 produces a train of sync signals having properly arranged picture element periods leading to a minimum deviation, to which picture elements of the picture information stored in the memory 32 are synchronized respectively. The drive source 22 drives the light source 10 in response to the sync signals, so as to accomplish a necessary exposure for each picture element with a light beam having an optimum picture element period.

Thus, the influence of jitter due to a speed variation is eliminated even when the optical deflector 14 has such a speed variation as causing a jitter at a period of several tens to several hundreds of lines. In an example wherein a base clock 28 having a frequency of 40 MHz is used and the standard effective scanning time width is 1.2 msec. relative to a scanning line containing 3,000 picture elements, the jitter can be reduced to at most 0.0021%.

The light beam 12 emitted by the light source 10 is deflected in a plane or in a linear direction as shown by arrow A by means of the optical deflector 14, focus adjusted by the fθ lens 20, and directed to the subject 18 in the form of a photosensitive material or member along a primary scanning line 34 with a minimized deviation of picture element position.

While the primary scanning is repeated, the subject 18 undergoes auxiliary scanning transfer by means of auxiliary scanning transfer means (not shown). The subject 18 is scanned over its entire surface for imagewise exposure.

Thus, the imagewise exposed photosensitive material or member is developed in the image forming section 5 where it is further fixed, or the image is transferred to another recording medium such as paper or OHP sheet and fixed or post-heated thereto, eventually providing a visible reproduced image.

The finally reproduced visible image is an excellent image free of an influence of jitter of a picture element position at a low frequency.

An example is given below by way of illustration. Since the picture element sync signal control means 26 has three functions of (1) measuring the time duration from SOS at sensor 24a to EOS at sensor 24b, (2) comparing the measurement with the standard value, and (3) producing a period modifying signal, an ordinary counter IC such as 74F163A available from Fairchild Co. may be used to perform function (1) while a microprocessor such as μPD 7810 available from NEC may be used to perform functions (2) and (3). The clock 28 may be a quartz oscillator such as TCO-707F (40 MHz) available from Toyocom K.K. The variable frequency divider 30 may be a counter IC such as 74F163A available from Fairchild Co. The memory 32 has a storage capacity of 3000 picture elements by 8 bits by three colors. Three chips of μPD 4364C-20L (NEC) may be connected at the input terminals to the reading section 2 and the address counter 30 and at the output terminal to modulators for three colors. The memory 32 which has read-out data stored therein reads out data at addresses increasing in accordance with clock pulses from address counter 30, followed by modulation for light exposure.

As apparent from the foregoing description, the period varying beam recorder of the present invention can reduce significantly the jitter of a picture element position at a low frequency of several tens to several hundreds of lines caused by an optical deflector such as a polygonal mirror, using a correction circuit of relatively simple construction.

The period varying beam recorder of the present invention can produce an image of quality without a cost increase because the jitter of a picture element position caused by an optical deflector is reduced significantly even when the drive motor of the optical deflector is not of high precision and experiences a speed variation.

What is claimed is:

1. A period varying beam recorder, comprising:
a light source for emitting a light beam carrying picture information;
an optical deflector for deflecting the light beam in a plane, the light beam being directed to a photosensitive material or member to conduct primary scanning, the light beam being deflected in the plane at least over an effective scanning width necessary for the primary scanning of the photosensitive material or member;
detector means, having at least one detector, disposed outside of at least one end of the effective scanning width for detecting the light beam for determining a scanning time over the effective scanning width;
period varying means for varying the period of a picture element sync signal for use in carrying picture information on the light beam; and
control means for controlling the period of the picture element sync signal on the basis of the scanning time such that the exposure timing of each picture element is optimized, wherein said exposure timing of said each picture element is optimized by alternately combining first and second picture element periods when said picture element period cannot be derived by said period varying means.

2. The period varying beam recorder of claim 1, further comprising:
a clock for generating a pulse signal of a certain period, wherein said period varying means cooperates with said clock and said control means to produce a sync signal of a variable period.

3. The period varying beam recorder of claim 2, wherein said period varying means comprises a demultiplier.

4. The period varying beam recorder of any one of claims 1 to 3, wherein said detector means includes at least one optical detector disposed outside at least one end of the effective scanning width.

* * * * *